United States Patent Office 3,681,315
Patented Aug. 1, 1972

3,681,315
PROCESS FOR PRODUCING BUTADIENE POLYMER
Yoshiharu Yagi, Ibaragi, Akira Kobayashi, Nishinomiya, and Itsuro Hirata and Hiroshi Sato, Takatsuki, Japan, assignors to Sumitomo Chemicals Co., Ltd., Osaka-shi, Japan
No Drawing. Filed May 18, 1970, Ser. No. 38,487
Claims priority, application Japan, May 19, 1969, 44/38,892; June 5, 1969, 44/44,488; Dec. 16, 1969, 44/101,433
Int. Cl. C08d 1/14, 3/06
U.S. Cl. 260—94.3          16 Claims

ABSTRACT OF THE DISCLOSURE

Process for producing butadiene polymer containing predominantly cis-1,4 structure which comprises polymerizing 1,3-butadiene in the presence of a catalyst system in a liquid medium at a temperature of −30 to 150° C., the catalyst system consisting essentially of (A) at least one of nickel and cobalt compounds, (B) a trialkyl aluminum compound and (C) at least one member selected from the group consisting of (1) the combination of a hydroquinone compound represented by the formula:

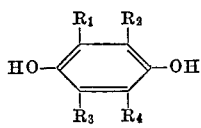

[I]

(wherein $R_1$, $R_2$, $R_3$ and $R_4$ are individually a hydrogen atom or a halogen atom or the combination of $R_1$ with $R_2$ and/or of $R_3$ with $R_4$ may represent an aromatic condensed ring(s) and the remaining ones are, if any, each a hydrogen atom or a halogen atom) with a benzotrifluoride compound represented by the formula:

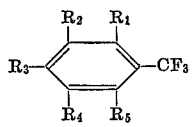

[II]

(wherein $R_1$, $R_2$, $R_3$, $R_4$ and $R_5$ are individually a hydrogen atom, a halogen atom, an alkyl group or a fluoroalkyl group), (2) the hydroquinone compound represented by the Formula I, or (3) a penta-halogenated phenol compound represented by the formula:

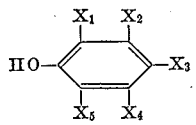

[III]

(wherein $X_1$, $X_2$, $X_3$, $X_4$ and $X_5$ are individually a halogen atom).

---

The present invention relates to a process for producing butadiene polymer. More particularly, it relates to a process for producing butadiene polymer containing predominantly cis-1,4 structure by use of a novel catalyst system.

The known catalyst systems for the production of butadiene polymer, particularly containing predominantly cis-1,4 structure, are classified as follows: (1) the system consisting essentially of a halogenated titanium compound and alkyl aluminum, (2) the system consisting essentially of a halogenated cobalt compound and alkyl aluminum halide, (3) the system consisting essentially of a nickel or cobalt compound, alkyl aluminum and a halogenated inorganic compound which is generally accepted as a Lewis acid or its derivative and (4) an organic lithium compound.

Among these catalyst systems, the ternary catalyst system (3) has been highly evaluated, because of its high catalystic activity and various advantageous characteristics on its manufacturing process.

In such catalyst system, the alkyl aluminum available for the second component and the halogenated inorganic compound available for the third component have a great influence on the catalystic activity and on the stereoregularity as well as the physical properties of the product. For instance, the use of trialkyl aluminum (e.g. triethyl aluminum) as the second component and a halogen-containing inorganic compound with a generally known Lewis acid property (e.g. boron trifluoride or its ether complex, titanium tetrachloride, vanadyl chloride) as the third component has been proposed.

As the results of the extensive studies on various catalyst systems for polymerization of 1,3-butadiene, the present inventors have found a novel catalyst system which has a high catalystic activity in polymerization and can afford a rubber-like polymer containing predominantly cis-1,4-structure.

According to the present invention, there is provided a process for producing butadiene polymer which comprises polymerizing 1,3-butadiene in the presence of a catalyst system consisting essentially of (A) at least one of nickel and cobalt compounds, (B) a trialkyl aluminum compound and (C) at least one member selected from the group consisting of (1) the combination of a hydroquinone compound represented by the formula:

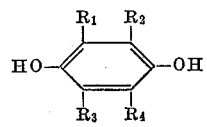

[I]

(wherein $R_1$, $R_2$, $R_3$ and $R_4$ are individually a hydrogen atom or a halogen atom or the combination of $R_1$ with $R_2$ and/or of $R_3$ with $R_4$ may represent an aromatic condensed ring system(s) (e.g. benzene, naphthalene, anthracene) and the remaining ones are, if any, each a hydrogen atom or a halogen atom) with a benzotrifluoride compound represented by the formula:

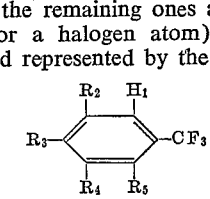

[II]

(wherein $R_1$, $R_2$, $R_3$, $R_4$ and $R_5$ are individually a hydrogen atom, a halogen atom, an alkyl group or a fluoroalkyl group), (2) the hydroquinone compound represented by the Formula I or (3) a penta-halogenated phenol compound represented by the formula:

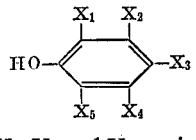

[III]

(wherein $X_1$, $X_2$, $X_3$, $X_4$ and $X_5$ are individually a halogen atom).

In the above definitions of the symbols, the term "alkyl" is preferred to be lower alkyl having 1 to 6 carbon atoms and the term "halogen" is intended to cover four kinds of halogen atoms, i.e. chlorine, bromine, iodine and fluorine.

As the nickel and cobalt compounds, there may be employed the one(s) selected from various salts and organic complex compounds of nickel and cobalt such as nickel halides (e.g. nickel chloride), nickel sulphate, organic acid salts of nickel (e.g. nickel acetate, nickel naphthenate, nickel octanoate, nickel salts of organic sulfonic acids), complex compounds of nickel salts (e.g. nickel chloride-pyridine complex, tris(dipyridyl)nickel chloride, bis(ethylenediamine)-nickel sulfate), organic coordination compounds of nickel or nickel chelate compounds (e.g. bis-dimethylglyoxymato nickel, bis-ethylacetoacetate nickel, bis-acetylacetonate nickel) and their cobalt alternatives. The use of the nickel compounds is generally preferred.

Examples of the trialkyl aluminum compound include trimethyl aluminum, triethyl aluminum, tri-n-buttyl aluminum, triisobutyl aluminum and tri-n-hexyl aluminum.

Examples of the hydroquinone compound [I] are hydroquinone, tetrachlorohydroquinone, 2,3,5-trichlorohydroquinone, 2,5-dichlorohydroquinone, 2-chlorohydroquinone, 1,4-dihydroxy-naphthalene, 1,4-dihydroxy-2,3-dichloronaphthalene, 9,10-dihydroxyanthracene, 1,4-dihydroxyanthracene; 1,4-dihydroxyphenanthrene.

Examples of the benzotrifluoride compound [II] are
benzotrifluoride,
2-chlorobenzotrifluoride,
3-chlorobenzotrifluoride,
4-chlorobenzotrifluoride,
2-bromobenzotrifluoride,
3-bromobenzotrifluoride,
4-bromobenzotrifluoride,
2,5-dichlorobenzotrifluoride,
3,4-dichlorobenzotrifluoride,
2,3-dibromobenzotrifluoride,
2,5-difluorobenzotrifluoride,
3,5-difluorobenzotrifluoride,
2-methylbenzotrifluoride,
3-methylbenzotrifluoride,
4-methylbenzotrifluoride,
2-hexylbenzotrifluoride,
4-hexylbenzotrifluoride,
2-dodecylbenzotrifluoride,
4-dodecylbenzotrifluoride,
2-monofluoromethylbenzotrifluoride,
3-difluoromethylbenzotrifluoride,
1,3-bis(trifluoromethyl)benzene,
3-(3'-fluoropropyl)benzotrifluoride,
4-(2',3',difluoropropyl)benzotrifluoride,
1,3,5-tris(trifluoromethyl)benzene,
2-methyl-4-chlorobenzotrifluoride,
3-bromo-4-ethylbenzotrifluoride,
2-methyl-4-trifluoromethylbenzotrifluoride,
3-fluoro-4-trifluoromethylbenzotrifluoride, etc.

Examples of the penta-halogenated compound [III] are pentachlorophenol, pentabromophenol, etc.

The catalytic activity of the catalyst system of the present invention is varied depending on the mixing ratio of the components, the mixing order of the components, the concentration of each component, the temperautre during the preparation of the catalyst system and the like. Of these, the mixing ratio of the components has particularly a great influence on the catalytic activity. The molar ratios of the nickel or cobalt compound to the trialkyl aluminum compound, the trialkyl aluminum compound to the benzotrifluoride compound, the trialkyl aluminum compound to the hydroquinone compound or the penta-halogenated compound and the nickel or cobalt compound to the hydroquinone compound may vary in the range from 0.001 to 2 (preferably 0.01 to 1), 0.1 to 5.0, 0.1 to 5.0 and 0.01 to 100 (preferably 0.1 to 10), respectively. Further, the nickel or cobalt compound may be used preferably in an amount of 0.0001 to 5% based on the amount of 1,3-butadiene monomer.

The mixing of each of the components for preparation of the catalyst system can be accomplished in any optional order and is usually carried out in the presence of a diluent. For obtaining the catalyst system with a higher activity, the nickel or cobalt compound and the trialkyl aluminum compound may be allowed to contact each other in the presence of a small amount of aliphatic conjugated dienes (e.g. 1,3-butadiene, isoprene, dimethylbutadiene). Such technique will lead to prevention of insoluble-material formation during the preparation and can thus minimize the harmful influence caused by contamination with a small amount of impurity in the polymerization system.

The temperature during the preparation of the catalyst system may be between −80 and 70° C., preferably between −20 and 30° C. For instance, it is preferable that the trialkyl aluminum compound and the benzotrifluoride compound, if necessary, may be heated at a desired temperature between 30 and 150° C. prior to the catalyst preparation. This treatment can accelerate the reaction of the trialkyl aluminum compound with the benzotrifluoride compound and thus leads to better results. Furthermore, after mixing all of the components, it is preferable that an ageing treatment be carried out at a temperature between 0 and 100° C.

The catalytic activity may be varied depending on the conditions of the catalyst ageing process. So, one can govern the physical properties of the polymer obtained.

Examples of the method for preparing the catalyst system include: (1) a method comprising admixing first the nickel or cobalt compound with the hydroquinone compound or penta-halogenated phenol compound and then incorporating the trialkyl aluminum compound into the resultant mixture in the presence of a small amount of 1,3-butadiene; (2) a method comprising admixing first the nickel or cobalt compound with the trialkyl aluminum compound and then incorporating the hydroquinone compound or the penta-halogenated phenol compound into the resultant mixture in the presence or absence of 1,3-butadiene; (3) a method comprising admixing first the nickel or cobalt compound with the trialkyl aluminum compound in the presence of 1,3-butadiene and incorporating the hydroquinone compound or the penta-halogenated phenol compound into the resultant mixture; (4) a method comprising admixing first the trialkyl aluminum compound with the hydroquinone compound or the penta-halogenated phenol compound and then incorporating the nickel or cobalt compound into the resultant mixture in the presence or absence of 1,3-butadiene; (5) a method comprising admixing the trialkyl aluminum compound with the benzotrifluoride compound in a diluent, heating at a suitable temperature, adding to it a small amount of 1,3-butadiene after cooling, then incorporating into the resultant mixture the nickel or cobalt compound and the hydroquinone compound or the hydroquinone compound and the nickel or cobalt compound in the described order and finally ageing the resultant catalyst system at a suitable temperature; (6) a method comprising dissolving or suspending the nickel or cobalt compound and the hydroquinone compound in a diluent, adding none or a small amount of 1,3-butadiene under enough cooling, then incorporating into the resultant mixture a solution of the trialkyl aluminum compound and the benzotrifluoride compound and finally ageing the resultant catalyst system at a suitable temperature; and (7) a method comprising dissolving or suspending the nickel or cobalt compound and the hydroquinone compound in a diluent, adding a small amount of 1,3-butadiene under enough cooling, incorporating into the resultant mixture the trialkyl aluminum compound and the benzotrifluoride compound successively and finally ageing the resultant catalyst system at a suitable temperature.

In accordance with the present invention, the intrinsic viscosity of butadiene polymer can be widely varied depending on the conditions at the preparation of the catalyst system and/or at the polymerization.

In the polymerization of 1,3-butadiene according to the present invention, the reaction is effected under the environment substantially free from any inhibitive material which is occasionally encountered with the generally accepted Ziegler-Natta-type catalysts.

Examples of the solvent as the diluent for the catalyst system and/or as the reaction medium for the polymerization include aromatic hydrocarbons (e.g. benzene, toluene, xylene), aliphatic hydrocarbons (e.g. hexane, heptane, benzine, alicyclic hydrocarbons (e.g. cyclohexane (Decalin), hydrogenated aromatic hydrocarbons (e.g. tetralin), etc.

The polymerization is carried out by contacting 1,3-butadiene with the catalyst system in a liquid medium at a temperature from −30 to 150° C., preferably from 0 to 100° C. The catalyst system and 1,3-butadiene may be supplied to the reaction system in an optional order in the presence or absence of the liquid medium.

The recovery of the produced polymer from the reaction mixture may be performed in a per se conventional manner. For instance, the reaction mixture is poured into a large amount of aqueous or alcoholic medium such as methanol, isopropanol, methanol-acetone or hot water, if necessary, with previous addition of an antioxidant (e.g. phenol-$\beta$-naphthylamine, 2,6-di-tert-butyl-p-cresol), and then the precipitate is collected and washed with methanol to obtain a substantially colorless rubber-like polymer.

The butadiene polymer produced by the present invention is a rubber-like solid or highly viscous material. The analysis of the microstructure according to the D. Morero's infrared absorption method [D. Morero et al.: Chim. e Ind. 41, 758, (1959)] reveals normally the presence of cis-1,4-structure in more than 85% of the butadiene unit.

Practical and presently-preferred embodiments of the invention are shown in the following examples.

EXAMPLE 1

In a glass-made, pressure-bottle, there were mixed (A) 0.2 mmole of bis-acetylacetonate nickel, (B) 1.0 mmole of triethyl aluminum, (C) 1.0 mmole of tetrachloro-p-hydroquinone, 30 ml. of toluene and 0.7 g. of 1,3-butadiene under a stream of argon or nitrogen by either one of the following procedures: [1–I] the component (A), the component (C) and 1,3-butadiene were added to toluene and then the component (B) was added thereto; [1–II] the component (A) and 1,3-butadiene were added to toluene, the component (B) was added thereto and then the component (C) was added to the resultant solution; and [1–III] the component (B) and the component (C) were added to toluene, the resultant solution was heated for 1 hour at 100° C. and cooled, 1,3-butadiene was added to the resulting solution and then the component (A) was added thereto. After charging 9.3 g. of 1,3-butadiene, the bottle was sealed. Polymerization was carried out for 2 hours at 40° C. To the reaction mixture, benzene containing phenyl-$\beta$-naphthylamine was added, and the resultant mixture was poured into methanol containing phenyl-$\beta$-naphthylamine while being stirred. The precipitated rubber-like polymer was collected, washed three times with methanol containing phenyl-$\beta$-naphthylamine and dried at room temperature under reduced pressure. The results of the analysis of the microstructure of the product according to the Morero's method are shown in Table 1.

TABLE 1

| Produced for preparing the catalyst system | Produced polymer | | | | |
|---|---|---|---|---|---|
| | Yield (g.) | Microstructure (percent) | | | $[\eta]$ [1] |
| | | Cis-1,4 | Trans-1,4 | 1,2- | |
| 1–I | 7.7 | 88.5 | 6.3 | 5.2 | |
| 1–II | 9.4 | 89.3 | 5.1 | 5.2 | |
| 1–III | 10 | 90.7 | 4.7 | 5.4 | 1.21 |

[1] Intrinsic viscosity in xylene at 70° C. (dl./g.).

EXAMPLE 2

In a glass-made, pressure-bottle, there were charged 30 ml. of toluene, 0.2 mmole of bis-acetylacetonate nickel, 1.0 mmole of pentachlorophenol and 0.7 g. of 1,3-butadiene, and then 1.0 mmole of triethyl aluminum was added thereto under a stream of argon. After adding 9.3 g. of 1,3-butadiene thereto under cooling, polymerization was carried out for 2 hours at 40° C. The reaction mixture was treated as in Example 1 to give 4.6 g. of rubber-like polymer, of which the infrared absorption spectrum revealed the content of cis-1,4 structure to be more than 85%.

EXAMPLE 3

In a glass-made, pressure-bottle, there were charged 30 ml. of toluene, 1.0 mmole of nickel naphthenate, 3.0 mmole of hydroquinone and 0.7 g. of 1,3-butadiene, and then 3.0 mmole of triethyl aluminum were added thereto under a stream of argon. After cooling, 9.3 g. of 1,3-butadiene were added thereto. Polymerization was carried out for 15 hours at 40° C. The reaction mixture was treated as in Example 1 to give 1.0 g. of rubber-like polymer, of which the infrared absorption spectrum revealed the content of cis-1,4 structure to be more than 85%.

EXAMPLE 4

In a glass-made, pressure-bottle, there were charged 15 ml. of toluene, 0.1 mmole of tris-acetylacetonate cobalt, 0.5 mmole of tetrachloro-p-hydroquinone and 0.7 g. of 1,3-butadiene, and 1.0 mmole of triethyl aluminum was added thereto under a stream of argon. After allowing the catalyst solution to stand for 30 minutes at room temperature, 9.3 g. of 1,3-butadiene were added thereto under sufficient cooling. Polymerization was carried out for 3 hours at 40° C. The reaction mixture was treated as in Example 1 to give 1.0 g. of rubber-like polymer, of which the infrared absorption spectrum revealed the content of cis-1,4-structure to be more than 85%.

EXAMPLE 5

In a glass-made, pressure-bottle, there were charged 15 ml. of toluene, 0.1 mmole of cobalt naphthenate, 0.5 mmol of tetrachloro-p-hydroquinone and 0.7 g. of 1,3-butadiene, and 1.0 mmole of triethyl aluminum was added thereto under a stream of argon. After allowing the catalyst solution to stand for 30 minutes at room temperature, 9.3 g. of 1,3-butadiene were added thereto under sufficient cooling. Polymerization was carried out for 3 hours at 40° C. The reaction mixture was treated as in Example 1 to give 1.0 g. of rubber-like polymer, of which the infrared absorption spectrum revealed the content of cis-1,4 structure to be more than 85%.

EXAMPLE 6

In a glass-made, pressure-bottle, there was prepared a catalyst system comprising (A) bis-acetylacetonate nickel, (B) triethyl aluminum, (C) benzotrifluoride and (D) tetrachlorohydroquinone under a stream of argon or nitrogen by either one of the following procedures: [6–I] 2.5 mmole of the component (B) and 3.44 mmole of the component (C) were added to 10 ml. of toluene, the resultant solution was heated for 1 hour at 100° C. and cooled 1.0 g. of 1,3-butadiene was added thereto, and then a 1/10 volume of the resultant solution (hereinafter referred to as "(B)-(C) treated solution") was added to a mixture of 20 ml. of toluene, 0.025 mmole of the component (A) and 0.07 mmole of the component (D), followed by ageing the resulting catalyst soluttion for 15 minutes at 40° C.; [6–II] a 1/10 volume of the (B)-(C) treated solution prepared as above was added to a solution of 0.025 or 0.05 mmole of the component (A) in 20 ml. of toluene, and then 0.07 or 0.139 mmole of the component (D) was added thereto, followed by ageing the catalyst solution for 15 minutes at 40° C.; [6–III] the procedure was as in [6–II] but preparing the (B)-(C) treated solution for 10 minutes at 130° C. and ageing the catalyst solution for 15 minutes at 60° C.; [6–IV] the procedure was as in [6–II] but not ageing the catalyst solution; and [6–V] the procedure was as in [6–II] but preparing the (B)-(C) treated solution without heating. Then, 9 ml. of toluene and 9.9 g. of 1,3-butadiene were charged, and the bottle was sealed. Polymerization was carried out for 2 hours at 40° C. To the reaction mixture, benzene containing phenyl-β-naphthylamine was added, and the resulting mixture was poured into methanol containing phenyl - β - naphthylamine while being stirred. The precipitated rubber-like polymer was collected, washed three times with methanol containing phenyl-β-naphthylamine and dried at room temperature under reduced pressure. The results of the analysis of the microstructure of the product according to the Morero's method are shown in Table 2.

TABLE 2

| Number | Catalyst components (mmol) | | | | Procedure for preparing the catalyst system | Produced polymer | | | | |
|---|---|---|---|---|---|---|---|---|---|---|
| | (A) | (B) | (C) | (D) | | Yield (g.) | Microstructure (percent) | | | $[\eta]$[1] |
| | | | | | | | Cis-1,4 | Trans-1,4 | 1,2 | |
| 1 | 0.025 | 0.25 | 0.344 | 0.07 | 6-I | 7.0 | 93.2 | 2.5 | 4.3 | |
| 2 | 0.025 | 0.25 | 0.344 | 0.07 | 6-II | 7.6 | 93.6 | 2.7 | 3.7 | |
| 3 | 0.025 | 0.25 | 0.344 | 0.07 | 6-II | 8.2 | 93.8 | 2.8 | 3.4 | 1.78 |
| 4 | 0.025 | 0.25 | 0.344 | 0.07 | 6-III | 6.9 | 94.1 | 2.3 | 3.6 | |
| 5 | 0.05 | 0.25 | 0.344 | 0.139 | 6-IV | 8.4 | 93.4 | 3.0 | 3.6 | 1.41 |
| 6 | 0.05 | 0.25 | 0.344 | 0.139 | 6-II | 7.8 | 93.3 | 2.7 | 4.0 | |
| 7 | 0.05 | 0.25 | 0.344 | 0.139 | 6-V | 7.4 | 91.5 | 4.2 | 4.3 | 1.09 |

[1] Intrinsic viscosity in xylene at 70° C. (dl./g.)

EXAMPLE 7

In a glass-made, pressure-bottle, there was prepared a catalyst system comprising (A) nickel naphthenate, (B) triethyl aluminum, (C) benzotrifluoride and (D) tetrachlorohydroquinone under a stream of argon or nitrogen by either one of the following procedures: [7–I] 1.5 mmole of the component (B) and 0.75, 1.5 or 2.26 mmole of the component (C) were added to 10 ml. of toluene, the resultant solution was heated for 1 hour at 100° C. and cooled, 1.0 g. of 1,3-butadiene and then 0.1 mmole of the component (A) were added thereto and a 1/10 volume of the resultant solution was added to a solution of a designated amount of the component (D) in a mixture of 14 ml. of toluene and 15 ml. of hexane, followed by ageing the catalyst solution for 15 minutes at 40° C.; and [7–II] 1.5 mmole of the component (B) and 1.95 mmole of the component (C) were added to 10 ml. of toluene, the resultant solution was heated for 5 hours at 100° C. and cooled, 1.0 g. of 1,3-butadiene and then 0.1 mmole of the component (A) were added thereto and a 1/10 volume of the resultant solution was added to a solution of a designated amount of the component (D) in a mixture of 14 ml. of toluene and 15 ml. of hexane or a mixture of 24 ml. of toluene and 25 ml. of hexane, followed by ageing the catalyst solution for 15 minutes at 40° C. After charging 9.9 g. of 1,3-butadiene, the bottle was sealed. Polymerization was carried out for 8 hours at 40° C. The reaction mixture was treated as in Example 6 to give a rubber-like polymer, of which the microstructure is shown in Table 3.

EXAMPLE 8

In a glass-made, pressure-bottle, there was prepared a catalyst system comprising (A) anhydrous nickel chloride, (B) triethyl aluminum, (C) benzotrifluoride and (D) tetrachlorohydroquinone under a stream of argon by the following procedure: 10 mmole of the component (B) and 13.8 mmole of the component (C) were added to 10 ml. of toluene, the resultant solution was heated for 1 hour at 105° C. and cooled sufficiently, 1.0 g. of 1,3-butadiene was added thereto and a 1/10 volume of the resultant solution was added to a solution of 0.1 mmole of the component (A) and 0.28 mmole of the component (D) in 29 ml. of toluene, followed by ageing the thus obtained catalyst solution for 15 minutes at 40° C. Then, 9.9 g. of 1,3-butadiene were charged, and the bottle was sealed. Polymerization was carried out for 2 hours at 40° C. The reaction mixture was treated as in Example 6 to give 7.5 g. of rubber-like polymer, of which the infrared absorption spectrum revealed the content of cis-1,4 structure to be more than 90%.

EXAMPLE 9

In a glass-made, pressure-bottle, there was prepared a catalyst system comprising (A) bis-ethylacetoacetate nickel, (B) triethyl aluminum, (C) benzotrifluoride and (D) tetrachlorohydroquinone under a stream of argon by the following procedure: 5.0 mmole of the component (B) and 6.9 mmole of the component (C) were added to 10 ml. of toluene, the resultant solution was heated for 1 hour at 100° C. and cooled sufficiently, 1.0 g. of 1,3-butadiene was added thereto and a 1/10 volume of the resultant solution was added to a solution of 0.05 mmole of the component (A) and 0.139 mmole of the component (D) in 29 ml. of toluene. Then, 9.9 g. of 1,3-butadiene were charged, and the bottle was sealed. Poylmerization was carried out for 2 hours at 40° C. The reaction mixture was treated as in Example 6 to give 7.0 g. of rubber-like polymer, of which the infrared absorption spectrum revealed the content of cis-1,4 structure to be more than 90%.

TABLE 3

| Number | Catalyst components (mmol) | | | | Procedure for preparing the catalyst system | Solvent (ml.) | Produced polymer | | | | |
|---|---|---|---|---|---|---|---|---|---|---|---|
| | (A) | (B) | (C) | (D) | | | Yield (g.) | Microstructure (percent) | | | $[\eta]$[1] |
| | | | | | | | | Cis=1,4 | Trans=1,4 | 1,2 | |
| 1 | 0.01 | 0.15 | 0.075 | 0.03 | 7-I | 30 | 9.0 | 92.7 | 3.1 | 4.2 | 1.72 |
| 2 | 0.01 | 0.15 | 0.075 | 0.04 | 7-I | 30 | 8.5 | 92.2 | 3.4 | 4.4 | 1.10 |
| 3 | 0.01 | 0.15 | 0.15 | 0.02 | 7-I | 30 | 7.8 | 93.4 | 2.9 | 3.7 | 2.00 |
| 4 | 0.01 | 0.15 | 0.15 | 0.03 | 7-I | 30 | 9.5 | 92.9 | 3.1 | 4.0 | 1.52 |
| 5 | 0.01 | 0.15 | 0.15 | 0.04 | 7-I | 30 | 9.1 | 93.8 | 2.8 | 3.4 | 1.16 |
| 6 | 0.01 | 0.15 | 0.226 | 0.02 | 7-I | 30 | 6.0 | 94.4 | 2.6 | 3.0 | 2.12 |
| 7 | 0.01 | 0.15 | 0.226 | 0.03 | 7-I | 30 | 5.7 | 93.9 | 2.9 | 3.2 | 1.92 |
| 8 | 0.01 | 0.15 | 0.195 | 0.012 | 7-II | 30 | 7.1 | 94.5 | 2.3 | 3.2 | 2.30 |
| 9 | 0.01 | 0.15 | 0.195 | 0.015 | 7-II | 30 | 8.7 | 93.7 | 2.6 | 3.7 | |
| 10 | 0.01 | 0.15 | 0.195 | 0.02 | 7-II | 30 | 9.1 | 92.9 | 3.1 | 4.0 | 1.94 |
| 11 | 0.01 | 0.15 | 0.195 | 0.015 | 7-II | 50 | 7.9 | 94.6 | 2.2 | 3.2 | 2.32 |
| 12 | 0.01 | 0.15 | 0.195 | 0.01 | 7-II | 50 | 8.1 | 93.2 | 2.9 | 3.9 | |

[1] Intrinsic viscosity in xylene at 70° C. (dl./g.).

EXAMPLE 10

In a glass-made, pressure-bottle, there was prepared a catalyst system comprising (A) nickel naphthenate, (B) triisobutyl aluminum, (C) benzotrifluoride and (D) tetrachlorohydroquinone under a stream of argon by the following procedure: 1.0 mmole of the component (B) and 1.4 mmole of the component (C) were dissolved in 5 ml. of toluene, the resultant solution was heated for 1 hour at 80° C. and cooled sufficiently, 0.1 g. of 1,3-butadiene was added thereto and the resulting solution was admixed with a solution of 0.1 mmole of the component (A) and 0.28 mmole of the component (D) in 25 ml. of toluene. Then, 9.9 g. of 1,3-butadiene were charged, and the bottle was sealed. Polymerization was carried out for 2 hours at 40° C. The reaction mixture was treated as in Example 6 to give 5.6 g. of rubber-like polymer, of which the microstructure was as follows: cis-1,4, 92.1%; trans-1,4, 3.4%; 1,2, 4.5%. The intrinsic visvosity measured in xylene at 70° C. was 1.23 (dl./g.).

EXAMPLE 11

In a glass-made, pressure-bottle, there was prepared a catalyst system comprising (A) bis-acetylacetonate nickel, (B) triethyl aluminum, (C) benzotrifluoride and (D) hydroquinone under a stream of argon by the following procedure: 1.0 mmole of the component (B) and 1.74 mmole of the component (C) were dissolved in 5 ml. of toluene, the resultant solution was heated for 1 hour at 100° C. and cooled sufficiently, 0.1 g. of 1,3-butadiene was added thereto and 25 ml. of toluene, 0.1 mmole of the component (A) and 1.0 mmole of the component (D) were successively added to the resultant solution, followed by ageing the thus obtained catalyst solution for 15 minutes at 40° C. Then, 9.9 g. of 1,3-butadiene were charged, and the bottle was sealed. Polymerization was carried out for 2 hours at 40° C. The reaction mixture was treated as in Example 6 to give 6.7 g. of rubber-like copolymer, of which the infrared absorption spectrum revealed the content of cis-1,4 structure to be more than 90%.

EXAMPLE 12

In a glass-made, pressure-bottle, there was prepared a catalyst system comprising (A) cobalt naphthenate, (B) triethyl aluminum, (C) benzotrifluoride and (D) tetrachlorohydroquinone under a stream of argon by the following procedure: 2.0 mmole of the component (B) and 2.0 mmole of the component (C) were dissolved in 5 ml. of toluene, the resultant solution was heated for 1 hour at 100° C. and cooled sufficiently, 1.0 g. of 1,3-butadiene was added thereto, 55 ml. of toluene and 0.2 mmole of the component (A) were successively added to the resulting solution and, after allowing it to stand for 30 minutes while being stirred, 0.2 mmole of the component (D) was added thereto, followed by ageing the thus obtained catalyst solution for 15 minutes at 40° C. Then, 22 g. of 1,3-butadiene were charged, and the bottle was sealed. Polymerization was carried out for 5 hours at 40° C. The reaction mixture was treated as in Example 6 to give 2.0 g. of rubber-like polymer, of which the infrared absorption spectrum revealed the content of cis-1,4 structure to be more than 90%.

EXAMPLE 13

In a glass-made, pressure-bottle, there was prepared a catalyst system comprising (A) nickel naphthenate, (B) triethyl aluminum, (C) benzotrifluoride and (D) 9,10-anthrahydroquinone under a stream of argon by the following procedure: 2.0 mmole of the component (B) and 2.0 mmole of the component (C) were dissolved in 5 ml. of toluene, the resultant solution was heated for 1 hour at 100° C. and cooled sufficiently, 1.0 g. of 1,3-butadiene was added thereto, the resultant solution was adjusted to a total volume of 60 ml. with toluene, 0.2 mmole of the component (A) was added thereto and, after allowing it to stand for 30 minutes while being stirred, 1.0 mmole of the component (D) was added thereto, followed by ageing the thus obtained catalyst solution for 15 minutes at 40° C. Then, 22 g. of 1,3-butadiene were charged, and the bottle was sealed. Polymerization was carried out for 5 hours at 40° C. The reaction mixture was treated as in Example 6 to give 16.2 g. of rubber-like polymer, of which the microstructure was as follows: cis-1,4, 94.3%; trans-1,4, 3.1%; 1,2, 2.6%. The intrinsic viscosity measured in toluene at 30° C. was 3.4 (dl./g.).

EXAMPLES 14 TO 20

In a glass-made, pressure-bottle, there was prepared a catalyst system comprising (A) nickel naphthenate, (B) triethyl aluminum, (C) derivatives of benzotrifluoride and (D) tetrachlorohydroquinone under an atmosphere of argon by the following procedure: 5.0 mmole of the component (B) and 5.0 mmole of the component (C) were added to 10 ml. of toluene, the resultant solution was heated for 1 hour at 100° C. and cooled sufficiently, 2.0 g. of 1,3-butadiene and then 0.5 mmole of the component (A) were added thereto and, after allowing it to stand for 30 minutes, a 1/10 volume of the resulting solution was added to a solution of 0.5 mmole of the component (D) in 40 ml. of toluene, followed by ageing the thus obtained catalyst solution for 15 minutes at 40° C. After charging 11 g. of 1,3-butadiene while cooling, the bottle was sealed. Polymerization was carried out for 5 hours at 40° C. Benzene containing 2,6-di-tert-butyl-4-methyl-phenol (hereinafter referred to as "BHT") was added to the reaction mixture, and the resultant mixture was poured into methanol containing BHT while being stirred. The precipitated rubber-like polymer was collected, washed three times with methanol containing BHT and dried at room temperature under reduced pressure. The results of the analysis of the microstructure of the product according to the Morero's method are shown in Table 4.

TABLE 4

| Example | Component (C) [1] (1.0 mmole) | Yield (g.) | Microstructure (percent) | | | $[\eta]$ [2] (dl./g.) |
|---|---|---|---|---|---|---|
| | | | Cis-1,4 | Trans-1,4 | 1,2 | |
| 14 | 2-chlorobenzotrifluoride | 11.4 | 89.34 | 5.49 | 5.15 | ------ |
| 15 | 3-chlorobenzotrifluoride | 11.3 | 88.91 | 5.45 | 5.63 | 1.4 |
| 16 | 4-chlorobenzotrifluoride | 6.0 | 89.12 | 5.39 | 5.47 | ------ |
| 17 | 2-bromobenzotrifluoride | 9.9 | 90.36 | 4.61 | 5.02 | ------ |
| 18 | 3-bromobenzotrifluoride | 10.6 | 90.14 | 4.96 | 4.89 | ------ |
| 19 | 4-bromobenzotrifluoride | 10.4 | 90.45 | 4.52 | 5.01 | 1.2 |
| 20 | 1,3-bis(trifluoromethyl)-benzene | 11.7 | 89.57 | 5.30 | 5.11 | 1.4 |

[1] Other components: component (A), nickel naphthenate (0.1 mmole); component (B), triethyl aluminum (1.0 mmole); component (C), tetrachlorohydroquinone (0.5 mmole).
[2] Intrinsic viscosity in toluene at 30° C.

EXAMPLES 21 AND 22

A catalyst system comprising the components (A), (B), (C) and (D) was prepared by the same procedure as in Example 14. To the resultant catalyst solution, 11 g. of 1,3-butadiene were added. Polymerization was carried out and the reaction mixture was treated as in Example 14. The results are shown in Table 5.

TABLE 5

| Example | Component (C)[1] (1.0 mmole) | Yield (g.) | Microstructure (percent) | | | $[\eta]$[2] (dl./g.) |
|---|---|---|---|---|---|---|
| | | | Cis-1,4 | Trans-1,4 | 1,2 | |
| 21 | 2-chlorobenzotrifluoride | 3.1 | 77.21 | 5.09 | 17.68 | 1.0 |
| 22 | 2-bromobenzotrifluoride | 3.6 | 65.67 | 3.53 | 30.79 | 1.1 |

[1] Other components: component (A), cobalt naphthenate (0.1 mmole); component (B), triethyl aluminum (1.0 mmole); component (D), tetrachlorohydroquinone (0.5 mmole).
[2] Intrinsic viscosity in toluene at 30° C.

EXAMPLES 23 TO 25

The preparation of the catalyst system, the polymerization and the after treatment were carried out as in Example 14 to give a rubber-like polymer. The results are shown in Table 6.

TABLE 6

| Example | Component (A)[1] (0.1 mmole) | Component (B)[1] (0.1 mmole) | Yield (g.) | Microstructure (percent) | | |
|---|---|---|---|---|---|---|
| | | | | Cis-1,4 | Trans-1,4 | 1,2 |
| 23 | Bis(ethylacetocetate) nickel. | Triethyl aluminum | 2.7 | | | |
| 24 | Bis-acetylacetonate nickel | do | 10.0 | 88.04 | 5.75 | 6.20 |
| 25 | do | Triisobutyl aluminum | 11.0 | | | |

[1] Other components: component (C), 2-chlorobenzotrifluoride (1.0 mmole); component (D), tetrachlorohydroquinone (0.5 mmole).

What is claimed is:

1. A process for producing butadiene polymer which comprises polymerizing 1,3-butadiene in the presence of a catalyst system consisting essentially of (A) at least one of nickel and cobalt compounds selected from the group consisting of nickel halides, nickel sulfates, organic acid salts of nickel, complex compounds of nickel salts, organic coordination compounds of nickel and nickel chelate compounds, and their cobalt alternatives, (B) a trialkyl aluminum compound and (C) at least one member selected from the group consisting of (1) the combination of a hydroquinone compound represented by the formula:

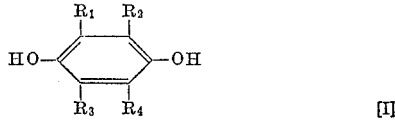

wherein $R_1$, $R_2$, $R_3$ and $R_4$ are each a hydrogen atom or a halogen atom or the combination of $R_1$ with $R_2$ and/or of $R_3$ with $R_4$ is an aromatic condensed ring(s) and the remaining substituents are, if any, each a hydrogen atom or a halogen atom with a benzotrifluoride compound represented by the formula:

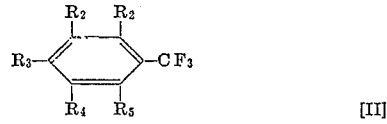

wherein $R_1$, $R_2$, $R_3$, $R_4$ and $R_5$ are each a hydrogen atom, a halogen atom, an alkyl group or a fluoroalkyl group, (2) the hydroquinone compound represented by the Formula I, and (3) a penta-halogenated phenol compound represented by the formula:

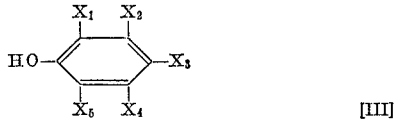

wherein $X_1$, $X_2$, $X_3$, $X_4$ and $X_5$, are individually a halogen atom to give a butadiene polymer containing predominantly cis-1,4 structure.

2. The process according to claim 1, wherein the polymerization is carried out in a liquid medium.

3. The process according to claim 1, wherein the polymerization is carried out at a temperature from —30 to 150° C.

4. The process according to claim 1, wherein the molar ratio of the nickel or cobalt compound to the trialkyl aluminum compound is 0.001 to 2.

5. The process according to claim 1, wherein the molar ratio of the trialkyl aluminum compound to the benzotrifluoride compound is 0.1 to 5.0.

6. The process according to claim 1, wherein the molar ratio of the trialkyl aluminum compound to the hydroquinone compound or the penta-halogenated phenol compound is 0.1 to 5.0.

7. The process according to claim 1, wherein the molar ratio of the nickel or cobalt compound to the hydroquinone compound is 0.01 to 100.

8. The process according to claim 1, wherein the nickel or cobalt compound is used in an amount of 0.0001 to 5% by weight based on the monomer butadiene.

9. The process according to claim 1, wherein the trialkyl aluminum compound is selected from the group consisting of trimethyl aluminum, triethyl aluminum, tri-n-butyl aluminum, triisobutyl aluminum and tri-n-hexyl aluminum.

10. The process according to claim 1, wherein the hydroquinone compound is selected from the group consisting of tetrachlorohydroquinone, 2,3,5-trichlorohydroquinone, 2,5-dichlorohydroquinone and 2-chlorohydroquinone, and their alternatives with other kind of halogen atoms, hydroquinone, 1,4-dihydroxynaphthalene, 1,4-dihydroxy-2,3-dichloronaphthalene, 9,10-dihydroxyanthracene, 1,4-dihydroxyanthracene and 1,4-dihydroxyphenenthrene.

11. The process according to claim 1, wherein the benzotrifluoride compound is selected from the group consisting of benzotrifluoride,
2-chlorobenzotrifluoride,
3-chlorobenzotrifluoride,
4-chlorobenzotrifluoride,
2-bromobenzotrifluoride,
3-bromobenzotrifluoride,
4-bromobenzotrifluoride,
2,5-dichlorobenzotrifluoride,
3,4-dichlorobenzotrifluoride,
2,3-dibromobezotrifluoride, 2,5-difluorobenzotrifluoride,
3,5-difluorobenzotrifluoride,
2-methylbenzotrifluoride,
3-methylbenzotrifluoride,
4-methylbenzotrifluoride,
2-hexylbenzotrifluoride,
4-hexylbenzotrifluoride,
2-dodecylbenzotrifluoride,
4-dodecylbenzotrifluoride,
2-monofluoromethylbenzotrifluoride,
3-difluoromethylbenzotrifluoride,
1,3-bis(trifluoromethyl)benzene,
3-(3'-fluoropropyl)benzotrifluoride,
4-(2',3'-fluoproyl)benzotrifluoride,
1,3,5-tris(trifluoromethyl)benzene,
2-methyl-4-chlorobenzotrifluoride,
3-bromo-4-ethylbenzotrifluoride,
2-methyl-4-trifluoromethylbenzotrifluoride and
3-methyl-4-trifluoromethylbenzotrifluoride.

12. The process according to claim 1, wherein the penta-halogenated phenol compound is selected from the group consisting of penta-chlorophenol and penta-bromophenol.

13. A process for producing butadiene polymer which comprises polymerizing 1,3-butadiene in the presence of a catalyst system consisting essentially of nickel organic carboxylate, triethylaluminum, benzotrifluoride and tetrachlorohydroquinone at a temperature from —30 to 150° C. in a liquid medium to give a butadiene polymer containing predominantly cis-1,4 structure.

14. The process according to claim 1, wherein the nickel or cobalt compound is selected from the group consisting of nickel chloride, nickel acetate, nickel naphthenate, nickel octanoate, nickel salts of organic sulfonic acids, nickel chloride-pyridine complex, tris(dipyridyl)-nickel chloride, bis(ethylenediamine)-nickel sulfate, bis-dimethylglyoxymato nickel, bis-ethylacetoacetate nickel, bis-acetylacetonate nickel and their cobalt alternatives.

15. A catalyst for polymerizing 1,3-butadiene, which comprises (A) at least one of nickel and cobalt compounds selected from the group consisting of nickel halides, nickel sulfates, organic acid salts of nickel, complex compounds of nickel salts, organic coordination compounds of nickel and nickel chelate compounds, and their cobalt alternatives, (B) a trialkylaluminum compound and (C) at least one member selected from the group consisting of (1) the combination of a hydroquinone compound represented by the formula:

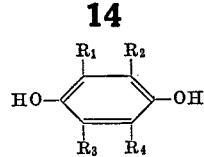

wherein $R_1$, $R_2$, $R_3$ and $R_4$ are each a hydrogen atom or a halogen atom or the combination of $R_1$ with $R_2$ and/or of $R_3$ with $R_4$ is an aromatic condensed ring(s) and the remaining ones are, if any, each a hydrogen atom or a halogen atom with a benzotrifluoride compound represented by the formula:

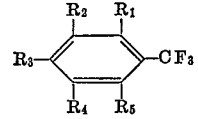

wherein $R_1$, $R_2$, $R_3$, $R_4$ and $R_5$ are each a hydrogen atom, a halogen atom, and alkyl group or a fluoroalkyl group, (2) the hydroquinone compound represented by the Formula I and (3) a penta-halogenated phenol compound represented by the formula:

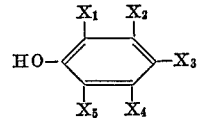

wherein $X_1$, $X_2$, $X_3$, $X_4$ and $X_5$ are individually a halogen atom.

16. The catalyst according to claim 15, wherein the nickel or cobalt compound is selected from the group consisting of nickel chloride, nickel acetate, nickel naphthenate, nickel octanoate, nickel salts or organic sulfonic acids, nickel chloride-pyridine complex, tris(dipyridyl)-nickel chloride, bis(ethylenediamine)-nickel sulfate, bis-dimethylglyoxymatoe nickel, bis-ethylacetoacetate nickel, bis-acetylacetanote nickel and their cobalt alternatives.

References Cited
UNITED STATES PATENTS 3,468,866 9/1969 Alferou et al. _____ 260—94.3
3,510,466 5/1970 Mazzei et al. _____ 260—94.3

JOSEPH L. SHOFER, Primary Examiner
R. A. GAITHER, Assistant Examiner

U.S. Cl. X.R.
252—429 A, 429 C, 431 R, 431 C